M. J. DOWNEY.
THEFT SIGNAL FOR MOTOR VEHICLES.
APPLICATION FILED JULY 24, 1920.
1,392,869.
Patented Oct. 4, 1921.
2 SHEETS—SHEET 2.
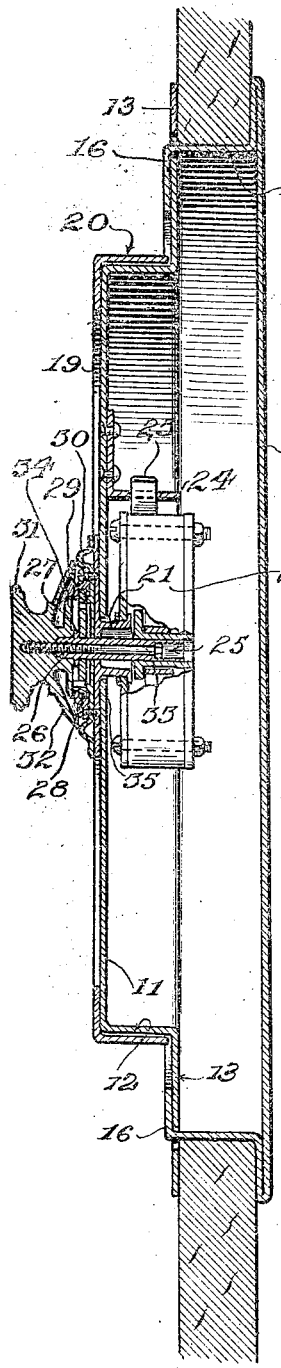
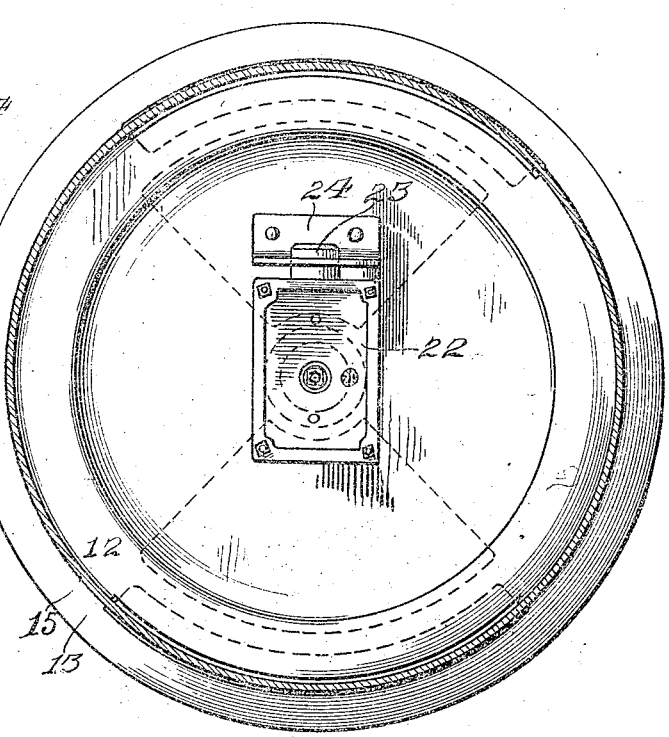
Inventor
M. J. Downey
By Lacey & Lacey, Attorneys

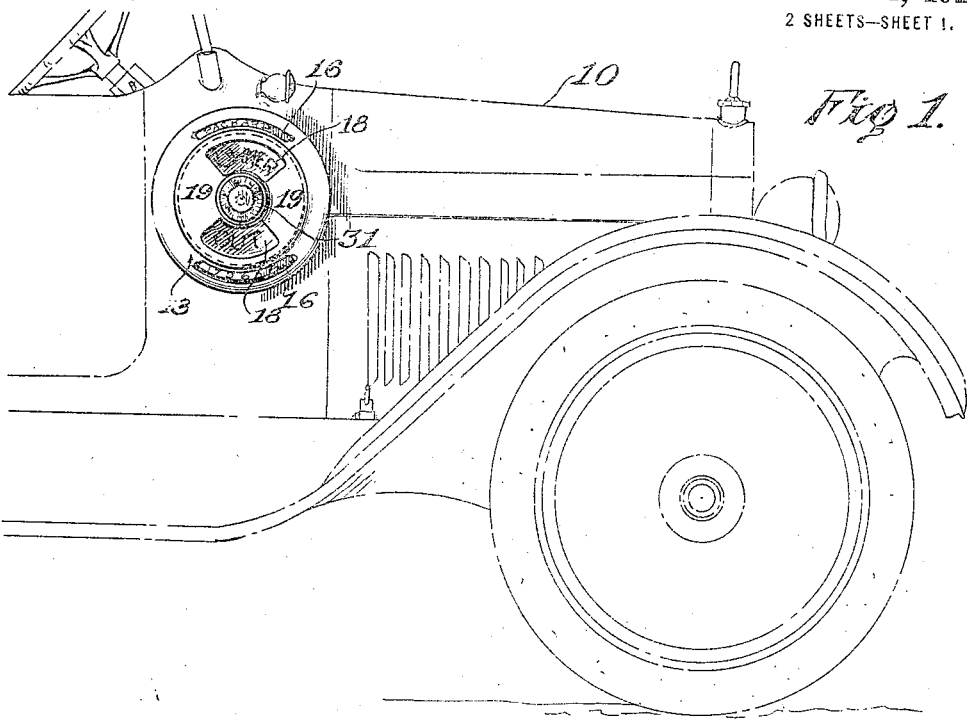
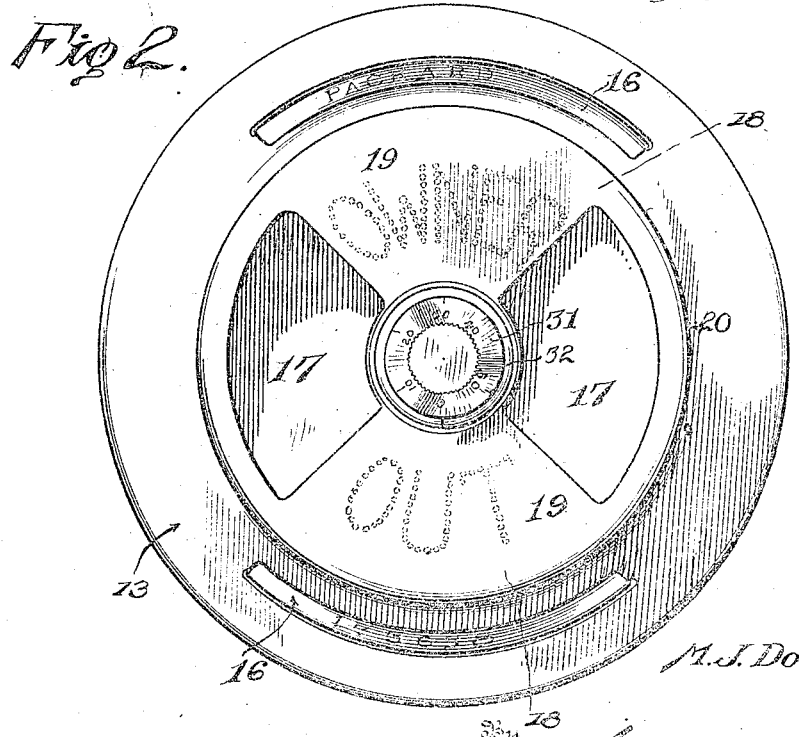

UNITED STATES PATENT OFFICE.

MILLARD J. DOWNEY, OF CHICAGO, ILLINOIS.

THEFT-SIGNAL FOR MOTOR-VEHICLES.

1,392,869.  Specification of Letters Patent.  Patented Oct. 4, 1921.

Application filed July 24, 1920. Serial No. 398,636.

*To all whom it may concern:*

Be it known that I, MILLARD J. DOWNEY, citizen of the United States, residing at Chicago, in the county of Cook and State of Illinois, have invented certain new and useful Improvements in Theft-Signals for Motor-Vehicles, of which the following is a specification.

This invention relates to an improved theft signal for automobiles and has as one of its principal objects to provide a device of this character whereby the owner of an automobile may, upon leaving his machine, indicate that he, the owner, is away from the machine, so that the machine cannot then be operated without the display of the signal indicating the unauthorized use of the machine.

The invention has as a further object to provide a signal which may be locked in position displaying a signal sign indicating that the owner is out of his machine so that a person attempting to steal the machine cannot operate the signal to obscure said sign.

And the invention has as a still further object to provide a signal which will be simple in its construction and which may be employed in connection with substantially any conventional design of motor vehicle.

Other and incidental objects will appear hereinafter.

In the drawings:

Figure 1 is a fragmentary side elevation showing a conventional motor vehicle equipped with my improved signal.

Fig. 2 is a front elevation showing the device detached.

Fig. 3 is a vertical sectional view taken medially through the device, and

Fig. 4 is a sectional view taken at substantially right angles to Fig. 3.

In order that the construction, mounting and operation of my improved signal may be accurately understood, I have, in the drawings, shown the device in connection with a motor vehicle 10 of conventional design. As particularly shown in Fig. 1, the device is mounted on one side wall of the vehicle body immediately in the rear of the engine hood of the vehicle and is preferably mounted at the right hand side of the vehicle so as to be disposed next to a street curb when the vehicle is standing. In carrying the invention into effect, I employ a drum or signal body 11 which is formed with an annular rim 12 having a flange 13 extending therefrom, this flange seating against the outer face of the side wall of the vehicle body. Closing the signal body at its rear side is a plate 14 seating against the inner face of the side wall of the vehicle body and having a circumferentially reduced annular rim 15 extending snugly through a suitable opening in said wall. Formed on the rim 15 at diametric points are flanges 16 which are engaged through suitable slots in the flange 13 of the signal body and are bent over to lie against the latter flange for thus securely connecting the closure plate with the signal body as well as firmly securing the device upon the vehicle. Preferably one of the flanges 16, when so bent over, is stenciled or otherwise provided upon its outer face with the name of the make of the vehicle upon which the signal is used while the other of the flanges 16 is stenciled or otherwise provided upon its outer face with the number of the vehicle. Accordingly, the signal will be positively identified with the particular vehicle with which it is employed and by stenciling the flanges, as just indicated, it will be practically impossible to efface the name and number of the vehicle thereon without mutilating the signal in such degree that the mutilation will be readily noticeable. Further, as will be perceived, the device cannot be removed without molesting these flanges so that the possibility of wrongful displacement of the signal will be reduced to a minimum.

The outer end of the signal body is laid off in oppositely disposed segments 17 which are blank and are painted or otherwise coated to conform to the color of the vehicle upon which the device is used. Lying at right angles to the segments 17 are segments 18 preferably painted red and bearing the signal sign "Owner out," these words being composed of stenciled letters or letters otherwise formed and the word "Owner" being upon the upper segment while the word "Out" is upon the lower segment. Fitting the signal body is a shutter having oppositely disposed segmental openings therethrough defining intermediate segments 19 connected by a rim 20 freely surrounding the signal body. The shutter is, like the segments 17 of the signal body, also preferably painted or otherwise coated to conform to the color of the vehicle body and rotatably supporting said shutter is a hollow trunnion 21 journaled through the signal body. Fixed to the inner end of said trunnion is a permutation lock of approved design. Thus, the lock will turn with the shutter and as particularly shown in Fig. 3, the lock is provided with a bolt 23 which, when the shutter is turned to position obscuring the signal sign, is engageable through a plate 24 suitably secured to the inner side of the signal body. Extending into the lock through the trunnion 21 is a squared hollow shaft 25 for actuating the lock bolt and formed on the shaft at its forward end is a cylindrical trunnion 26 at the base of which is a collar 27. Fitting the shaft beneath this collar is a perforated disk 28 rotatable for turning the shaft and overlying the peripheral margin of said disk is a retaining ring 29 fixed to a supporting plate 30 which is screwed or otherwise secured to the shutter. Fitted upon the trunnion 26 is a knob 31 provided with a dial 32 and engaged through the shaft 25 and threaded into said knob is a cap screw 33 connecting the knob with the shaft. Carried by the knob within the dial 32 is a disk 34 and projecting from this disk is a pin 35 engaged in one of the openings of the disk 28. Thus, when the knob is rotated, the shaft 25 will be rotated for operating the mechanism of the lock and retracting the bolt 23. Upon the retraction of this bolt the shutter will be freed for turning movement by the knob.

As will now be readily appreciated in view of the preceding description, as long as the owner is in the vehicle, the shutter of the device may be turned to obscure the signal sign. However, on leaving the vehicle, the owner will then rotate the shutter until the segments 19 thereof are disposed over the segments 17 of the signal body when the lock 22 will be so disposed that the bolt 23 thereof may be engaged with the plate 24. Consequently, by then properly turning the knob 31, the shutter may be locked in position exposing said signal. As will thus be readily perceived, anyone then attempting to steal the vehicle cannot avoid display of the signal "Owner out." Detection of a thief will thus be rendered readily possible.

Having thus described the invention, what is claimed as new is:

1. A device of the character described including a signal body provided with a signal sign, a shutter fitting over the signal body and rotatable thereon, a lock housed within the signal body and operable for locking the shutter in position exposing said sign, and a plate closing the signal body.

2. A device of the character described including a signal body having a rim provided with a flange, a shutter fitting over the signal body and having a rim confronting the rim of the body, the signal body being provided with a signal sign, means for locking the shutter in position exposing said sign, and a plate having a rim provided with flanges engaged through said first mentioned flange for connecting the plate with the signal body.

3. The combination with a motor vehicle, of a signal projecting through a wall of the vehicle body, the signal having a warning legend visible at the exterior of said wall, and means normally obscuring said legend and colored to conform to the color of the vehicle body whereby the uniformity of the vehicle body will normally be unbroken.

4. The combination with a motor vehicle, of a signal including a signal body exposed at the outer side of a wall of the body of the vehicle and provided with a warning legend, means normally obscuring said legend, and an attaching plate extending through said wall of the vehicle body from the inner side thereof and engaged with the signal body for securing the signal in position.

5. In a theft signal for motor vehicles, the combination of a signal body provided with a signal sign, a shutter rotatable upon the body for obscuring or exposing said sign, and locking means carried by the body for securing the shutter in position exposing the sign.

In testimony whereof I affix my signature.

MILLARD J. DOWNEY. [L. S.]